Dec. 25, 1956    R. E. GEARHART    2,775,327
OVERLOAD CLUTCH
Filed Nov. 20, 1953
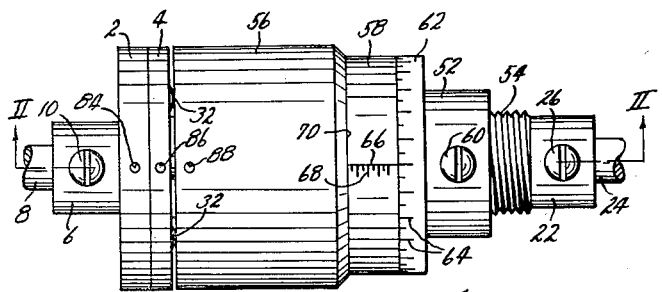
Fig. 1
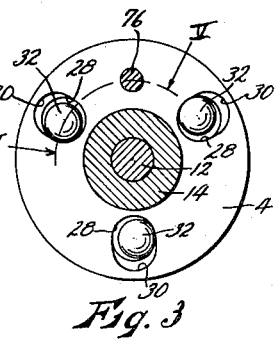
Fig. 3
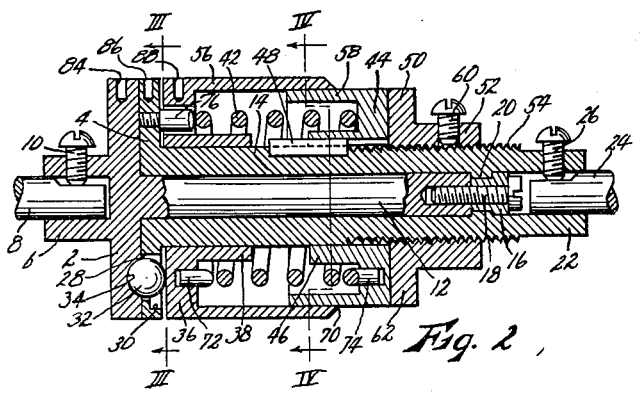
Fig. 2         Fig. 4
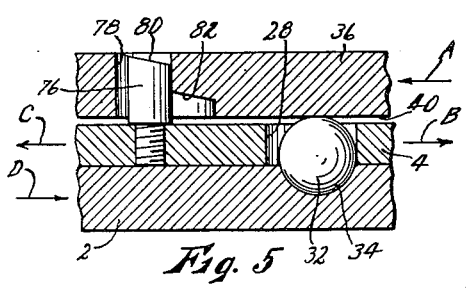
Fig. 5
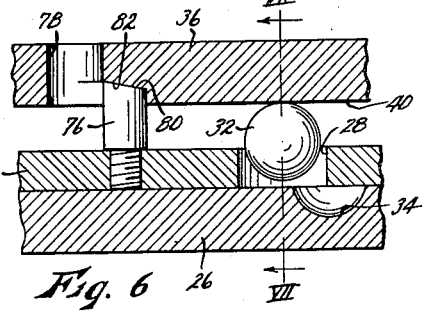
Fig. 6
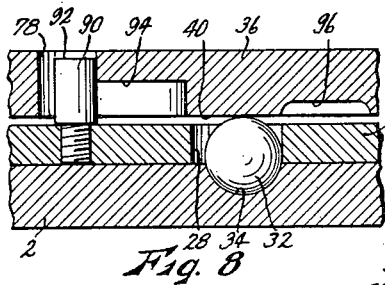
Fig. 8
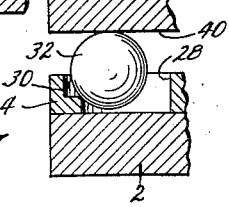
Fig. 7
Fig. 9
INVENTOR.
Roy E. Gearhart
BY
Hamilton + Hamilton
Attorneys.

United States Patent Office 2,775,327
Patented Dec. 25, 1956

2,775,327

OVERLOAD CLUTCH

Roy E. Gearhart, Kansas City, Mo., assignor of one-half to Robert F. Dickens, Overland Park, Kans.

Application November 20, 1953, Serial No. 393,256

6 Claims. (Cl. 192—56)

This invention relates to new and useful improvements in clutches, and has particular reference to that class thereof commonly known as overload clutches.

An important object of the present invention is the provision of an overload clutch of the class described which will disengage automatically whenever the torque being transmitted thereby exceeds a predetermined level, and having means whereby the release torque may be adjusted with a high degree of accuracy.

Another important object is the provision of an overload clutch of the character described which is completely free-running and noiseless when disengaged.

Other objects are simplicity and economy of construction, dependability and efficiency of operation, and adaptability for use in a wide variety of applications.

With these objects in view, as well as other objects which will appear in the course of the specification, reference will be had to the drawing, wherein:

Fig. 1 is a side elevational view of an overload clutch embodying the present invention.

Fig. 2 is a sectional view taken on line II—II of Fig. 1, with parts left in elevation.

Fig. 3 is a sectional view taken on line III—III of Fig. 2.

Fig. 4 is a sectional view taken on line IV—IV of Fig. 2.

Fig. 5 is an enlarged, fragmentary section taken on line V—V of Fig. 3, showing the clutch in the engaged position.

Fig. 6 is a view similar to Fig. 5, showing the clutch in the disengaged position.

Fig. 7 is a fragmentary sectional view taken on line VIII—VIII of Fig. 6.

Fig. 8 is a view similar to Fig. 5 showing a modified form of the clutch, in the engaged position.

Fig. 9 is a view similar to Fig. 8, showing the modified clutch in the disengaged position.

Like reference numerals apply to similar parts throughout the several views, and the numerals 2 and 4 apply respectively to a driven clutch member and a driving clutch member each having the form of a planar disc and being arranged coaxially for relative rotation. Clutch disc 2 is provided centrally of one face with an integral socket member 6, adapted to receive a driven shaft 8 coaxially with the disc, and provided with a set screw 10 for securing said shaft therein. At its opposite face, disc 2 is provided with an integral axially extending stub shaft 12. Clutch disc 4 is provided with a tubular hub 14 mounted for free rotation on stub shaft 12. Said hub and stub shaft are secured against relative longitudinal movement by a headed bushing 16 secured to the end of the stub shaft by screw 18 (see Fig. 2), the head of said bushing engaging one edge of an internal peripheral rib 20 formed in hub 14 and the end of the stub shaft engaging the other edge of said rib. The extended free end of hub 14 forms a socket 22 adapted to receive a driving shaft 24 coaxially therein, and having a set screw 26 for securing said shaft.

Driving clutch disc 4 is provided with a plurality of bores 28 extending entirely therethrough in parallel but spaced apart relation from the axis thereof, and spaced equally around the circumference of said disc. Each of said bores is provided with a radially outward extension 30, as best shown in Figs. 3 and 7, the purpose of which will be described hereinafter. In a direction parallel to the axis of the device, said extensions extend from the face of disc 4 distal from disc 2, and terminate at a point spaced apart from disc 2. Carried loosely in each of bores 28 is a spherical steel ball 32, and clutch disc 2 is provided with a spherical recess 34 normally in registry with each bore 28, and adapted to receive balls 32 therein. Recesses 34 are of less than hemispherical extent, so that when a torque is exerted on disc 4, the pressure of the walls of bores 28 on balls 32 will bend to dislodge the balls from said recesses, the torque required to affect said dislodgment depending on the force with which said balls are urged toward disc 2. It will be noted, as best shown in Figs. 2 and 5, that when each ball is embedded in a recess 34 of disc 2, said ball extends entirely through disc 4 and projects slightly beyond the opposite face thereof.

The balls 32 are urged toward disc 2 by a flat, circular pressure plate 36 arranged coaxially with disc 4 and having a tubular hub 38 carried rotatably on hub 14 of disc 4, and also adapted to slide axially along hub 14. The face 40 of said pressure plate adjacent disc 4 engages balls 32, and is urged resiliently against them by a helical spring 42 disposed axially about hub 14, said spring bearing at one end against the rearward face of pressure plate 36 and at its opposite end against a follower plate 44 having a tubular hub 46 carried for axial sliding movement on hub 14 but secured against rotation thereon by a key 48 fixed in hub 14 and slidable in a keyway 50 formed in hub 46. Follower 44 may be moved adjustably along hub 14, thereby adjusting the tension of spring 42 and the amount of torque required to disengage the clutch, by a nut 52 screwed on a threaded portion 54 of hub 14 and bearing against said follower. Pressure plate 36 is provided with a rearwardly extending integral barrel 56 which slidably engages a barrel 58 integral with and extending forwardly from follower plate 44, whereby to enclose spring 42. Nut 52 is provided with a set screw 60 for securing it to hub 14, whereby the adjustment thereof may be fixed and cannot vary accidentally. In order to facilitate close calibration of the spring tension, nut 52 is provided with a circular flange 62 on the peripheral edge of which is imprinted a scale 64 which may be read in conjunction with an index mark 66 imprinted on barrel 58. Coarse adjustments may be measured by a scale 68, imprinted longitudinally on barrel 58 and which may be read in conjunction with the edge 70 of barrel 56.

It is to be understood that spring 42, besides exerting a longitudinal compressional load against pressure plate 36, is also under torsional tension whereby to exert a force tending to rotate said pressure plate on hub 14. In order to transmit this torque, the extreme end portions of the spring are bent parallel to the axis of the spring and embedded respectively in pressure plate 36 and follower plate 44, as indicated at 72 and 74. The relative directions of force exerted on clutch disc 4 and pressure plate 36 are indicated by the arrows A and B in Fig. 5. Actual rotation of plate 36 relative to disc 4 is normally prevented by a pin 76 fixed in disc 4 parallel to but spaced apart from the axis thereof, and extending loosely into a bore 78 found in pressure plate 36. The end surface 80 of said pin is bevelled as shown in Figs. 5 and 6, and bore 78 is provided with a similarly bevelled shoulder 82. Shoulder 82 is disposed at such an elevation that it will be turned into engagement with the end of pin 76 by spring 42 when the pressure plate has been forced away from disc 4 by balls 32.

The operation of the device is substantially as follows:

Referring to Fig. 5, assume that driving shaft 24 is turning clutch disc 4 in the direction indicated by arrow C, the direction of load being indicated by arrow D. Torque is transmitted from disc 4 to disc 2 by balls 32, and since said balls are less than half embedded in disc 2, disc 4 also exerts a continuous force tending to move the balls out of recesses 34 of disc 2. This movement is of course resisted by pressure plate 36, which is urged against balls 32 by spring 42. However, when the torque being transmitted rises to such a degree that the unseating force on the balls exceeds the tension on spring 42, said balls will force pressure plate 36 outwardly against the pressure of spring 42. The movement of the pressure plate produced by the balls is sufficiently great to bring shoulder 82 opposite the end of pin 76, and enough past the end of said pin to allow a good operating clearance. The torsional tension of spring 42 then turns pressure plate 36 in the direction indicated by arrow A, and the movement of shoulder 82 over the bevelled end surface 80 of pin 76 cams plate 56 still farther away from clutch disc 2, completely freeing balls 32 from pressure, whereupon driving clutch disc 4 may turn relative to driven clutch disc 2 substantially without noise or friction. In order to prevent the balls from falling back against disc 2, the previously described radial extensions 30 of bores 28 in disc 4 are provided. As indiacted in Fig. 7, each ball is urged outwardly by centrifugal force into the associated bore extension as disc 4 continues to rotate, and extension 30 is so positioned that when the ball is positioned therein, it is held out of engagement with disc 2. Thus the clutch may be used in any position, and will remain noiseless and free-running.

Thus it will be seen that an overload clutch having several advantages has been produced. It is efficient and dependable, though quite simple and rugged in construction. It will release accurately on any predetermined torque, and said release torque may be adjusted with great accuracy. It will operate equally well when driving in either direction, is fully reversible. It is substantially free-running and noiseless when disengaged, and does not have any of the highly objectionable loud rattling or pounding noises commonly associated with the release of clutches of the spring-loaded ball type. It may be used in any position.

Once disengaged, the clutch may be reset by turning clutch discs 2 and 4 relatively to bring bores 28 and recesses 34 into alignment, and turning pressure plate 36 to bring bore 78 into alignment with pin 76, whereupon the clutch is engaged. In order to assist in this process, holes 84, 86 and 88 are formed respectively in the peripheral edges of disc 2, disc 4, and pressure plate 36, as best shown in Figs. 1 and 2. When these holes are aligned as shown in Fig. 1, the clutch will be engaged. While the torsion of spring 42 need not be great and the resetting may usually be accomplished manually, rods could be inserted in the holes to act as levers for turning the parts to perform the resetting.

In the modification shown in Figs. 8 and 9, the pin 90 corresponds to pin 76 in Fig. 5, but the end surface 92 thereof is parallel to the plane of plate 36. The shoulder 94, which corresponds to shoulder 82 in Fig. 5, is also parallel to the plane of pressure plate 36. Formed in the surface 40 of said pressure plate in association with each of the bores 28 of clutch plate 4 is a recess 96, said recess being disposed in angularly offset relation from bore 28 so long as pin 90 is positioned within bore 78 of plate 36, as shown in Fig. 8. However, when the pressure plate is cammed away from disc 4 by balls 32 to move shoulder 94 slightly past the end of pin 90, and pressure plate 36 is turned by the torsion of spring 42 to bring the shoulder into engagement with the end surface 92 of said pin, each recess 96 is moved into registry with its associated bore 28, as shown in Fig. 9. The balls are thus freed and relieved of all pressure, so as to permit the free-running, noiseless operation as described in connection with the species shown in Figs. 1 to 7. In all other respects, the construction and operation of the two species are identical.

Although I have shown and described certain specific embodiments of my invention, it is readily apparent that many minor changes of structure and operation could be made without departing from the spirit of the invention as defined by the scope of the appended claims.

What I claim as new and desire to protect by Letters Patent is:

1. An overload clutch comprising a pair of clutch discs secured together for relative coaxial rotation and adapted to be secured respectively to driving and driven members, one of said discs having a spherically curved recess of less than hemispherical extent formed in the surface thereof mating with the other of said clutch discs in spaced apart relation from the axis thereof, and the other of said clutch discs having a bore formed therein parallel to the axis thereof and normally registering with said recess, a ball carried for movement longitudinally in said bore and normally extending into said recess, a pressure member carried by said bored clutch disc for relative rotary and axial sliding movement and normally bearing against said ball, a spring carried by said bored clutch disc and operative both to exert an axial load on said pressure member, whereby to urge said ball yieldably into said recess, and to exert a rotary torque on said pressure member, means normally preventing relative rotation of said pressure member and said bored clutch disc, said last named means becoming inoperative when said pressure member is retracted against the spring as the relative torque between the discs forces said ball out of said recess, whereupon said pressure member is turned by the torsion of said spring, said pressure member and said bored clutch disc having cooperating surface operative as said pressure member turns to increase the distance between the recessed clutch disc and the effective portion of the pressure member to an amount greater than the diameter of said ball, whereby said ball is relieved of the spring pressure, and to secure said pressure member in the retracted position.

2. An overload clutch comprising a pair of clutch discs attached together for relative coaxial rotation but secured against relative axial movement, and adapted to be secured respectively to driving and driven members, one of said discs having a spherically curved recess of less than hemispherical extent formed in the surface thereof mating with the other of said discs in spaced relation from the axis thereof, and the other of said discs having a bore formed therethrough parallel to the axis thereof and normally in registry with said recess, a ball carried for movement longitudinally in said bore and normally projecting into said recess and entirely through said bore to extend outwardly from the opposite face of said bored disc, a pressure plate carried by said bored disc for relative rotary and axial sliding movement and normally bearing against the side of said ball opposite said recess, a spring carried by said bored disc and operative both to exert an axial load on said pressure plate whereby to urge said ball into said recess and to exert a rotary torque on said pressure plate, means normally preventing rotation of said pressure plate relative to said bored disc, but operative to release said pressure plate for rotation when the plate is retracted against said spring by said ball as it is carried out of said recess by the torque between the discs, said pressure plate and bored disc having cooperating surfaces operative as said members turn relatively to increase the distance between the recessed disc and the effective portion of the pressure plate to an amount greater than the diameter of said ball, and to latch said pressure plate in the retracted position.

3. The structure as set forth in claim 6 wherein the bored clutch disc is the driving disc and the recessed clutch disc is the driven disc, and wherein the bore in the bored disc is provided with a radially outward extension spaced apart from the mating surfaces of said discs, whereby when the clutch is disengaged, the continued rotation of the driving disc will urge said ball into said bore extension and prevent any contact thereof with the driven disc.

4. The structure as set forth in claim 2 wherein the cooperating surfaces of the bored disc and pressure plate constitute bevelled cam surfaces operative as the disc and plate turn relatively to force the pressure plate still further away from the recessed disc.

5. The structure as set forth in claim 2 having a pin fixed in said bored disc parallel to the axis thereof and extending into a bore formed therefor in said pressure plate, whereby relative rotation of said disc and plate is normally prevented, said last named bore having an angularly offset shoulder formed therein adapted to be brought opposite the end surface of said pin when said plate is retracted by the ball as it is forced out of the recess, whereby limited rotation of said plate relative to said bored disc is permitted, said shoulder and the end of said pin being bevelled whereby to function as cams as said plate turns to force said plate farther from the recessed disc.

6. The structure as set forth in claim 2 having a pin fixed in said bored disc parallel to the axis thereof and extending into a bore formed therefor in said pressure plate, whereby relative rotation of said disc and plate is normally prevented, said last named bore having an angularly offset shoulder formed therein adapted to be brought opposite the end surface of said pin as it is forced out of the recess, whereby limited rotation of said plate relative to said bored disc is permitted, and wherein said pressure plate is provided with a recess in the surface thereof adjacent said bored disc, said last named recess being normally angularly displaced from the bore of said bored disc but being adapted to be brought into registry therewith as said pressure plate turns to engage the shoulder thereof with the end of said pin, the distance between the recessed disc and the bottom of the pressure plate recess, in the disengaged position, being greater than the diameter of said ball.

References Cited in the file of this patent

UNITED STATES PATENTS

| | | |
|---|---|---|
| 1,555,098 | Benko | Sept. 29, 1925 |
| 1,883,164 | Vassakos | Oct. 18, 1932 |
| 2,257,759 | Niemann | Oct. 7, 1941 |
| 2,493,232 | Dodge | Jan. 3, 1950 |

FOREIGN PATENTS

| | | |
|---|---|---|
| 87,260 | Switzerland | Nov. 16, 1920 |